(12) United States Patent
Muhle et al.

(10) Patent No.: US 9,599,130 B2
(45) Date of Patent: Mar. 21, 2017

(54) FLOW RESTRICTOR AND GAS COMPRESSOR

(71) Applicants: Henrique Bruggmann Muhle, Joinville (BR); Dietmar Erich Bernhard Lilie, Joinville (BR)

(72) Inventors: Henrique Bruggmann Muhle, Joinville (BR); Dietmar Erich Bernhard Lilie, Joinville (BR)

(73) Assignee: Whirlpool S.A., Sao Paulo (BR)

( * ) Notice: Subject to any disclaimer, the term of this patent is extended or adjusted under 35 U.S.C. 154(b) by 392 days.

(21) Appl. No.: 14/358,528

(22) PCT Filed: Nov. 14, 2012

(86) PCT No.: PCT/BR2012/000448
§ 371 (c)(1),
(2) Date: May 15, 2014

(87) PCT Pub. No.: WO2013/071382
PCT Pub. Date: May 23, 2013

(65) Prior Publication Data
US 2014/0283679 A1  Sep. 25, 2014

(51) Int. Cl.
*F01B 31/26* (2006.01)
*F15B 15/24* (2006.01)
(Continued)

(52) U.S. Cl.
CPC ............ *F15B 15/24* (2013.01); *F04B 35/045* (2013.01); *F04B 39/122* (2013.01);
(Continued)

(58) Field of Classification Search
CPC .. F04B 39/0292; F04B 39/126; F16C 29/025; F16C 32/0618
(Continued)

(56) References Cited

U.S. PATENT DOCUMENTS

| 6,293,184 | B1 | 9/2001 | Unger |
| 6,733,875 | B1 * | 5/2004 | Takano ............... F16C 32/0618 427/373 |

(Continued)

FOREIGN PATENT DOCUMENTS

| DE | 10 2006 009 268 A1 | 8/2007 |
| GB | 1 536 118 | 12/1978 |
| WO | WO 2008/055809 | 5/2008 |

OTHER PUBLICATIONS

International Search Report mailed May 23, 2013 for International application No. PCT/BR2012/000448.
(Continued)

*Primary Examiner* — Michael Leslie
(74) *Attorney, Agent, or Firm* — Fay Sharpe LLP

(57) ABSTRACT

A flow restrictor (1) for application in bearing formation between a piston (2) and a cylinder (3) of a gas compressor (4). The gas compressor (4) includes a pad (5) externally surrounding the cylinder (3) and an inner cavity (6), arranged between the pad (5) and the cylinder (3), fluidly fed by a discharge flow arising from a compression movement exerted by the piston (2) within the cylinder (3). The gas compressor (4) includes a bearing formation gap (7) separating a piston outer wall (2) and an inner cylinder wall (3), and a flow restrictor (1) is provided with a housing (12) fluidly associating the inner cavity (6) to the bearing formation gap (7). The flow restrictor (1) includes a porous element (8), associated to the housing (12), provided with at least a restrictor part provided with a porosity sized to limit the gas flow flowing from the inner cavity (6) to the bearing formation gap (7).

7 Claims, 5 Drawing Sheets

(51) Int. Cl.
F04B 35/04 (2006.01)
F04B 39/12 (2006.01)
F04B 53/00 (2006.01)
F16C 29/02 (2006.01)
F16C 32/06 (2006.01)

(52) U.S. Cl.
CPC .......... *F04B 39/126* (2013.01); *F04B 53/008* (2013.01); *F16C 29/025* (2013.01); *F16C 32/0618* (2013.01)

(58) Field of Classification Search
USPC .......................................................... 384/12
See application file for complete search history.

(56) References Cited

U.S. PATENT DOCUMENTS

| | | | |
|---|---|---|---|
| 6,901,845 B2 | 6/2005 | Kiikka | |
| 8,973,848 B2* | 3/2015 | van der Steur | F16C 32/0618 239/223 |
| 2009/0238701 A1 | 9/2009 | Giacchi et al. | |
| 2010/0218548 A1 | 9/2010 | Giacchi et al. | |
| 2010/0229717 A1 | 9/2010 | Schubert | |

OTHER PUBLICATIONS

Written Opinion of the International Searching Authority mailed May 23, 2013 for International application No. PCT/BR2012/000448.

Written Opinion of the International Preliminary Examining Authority mailed Dec. 16, 2013 for International application No. PCT/BR2012/000448.

International Preliminary Report on Patentability completed Mar. 25, 2014 for International application No. PCT/BR2012/000448.

* cited by examiner

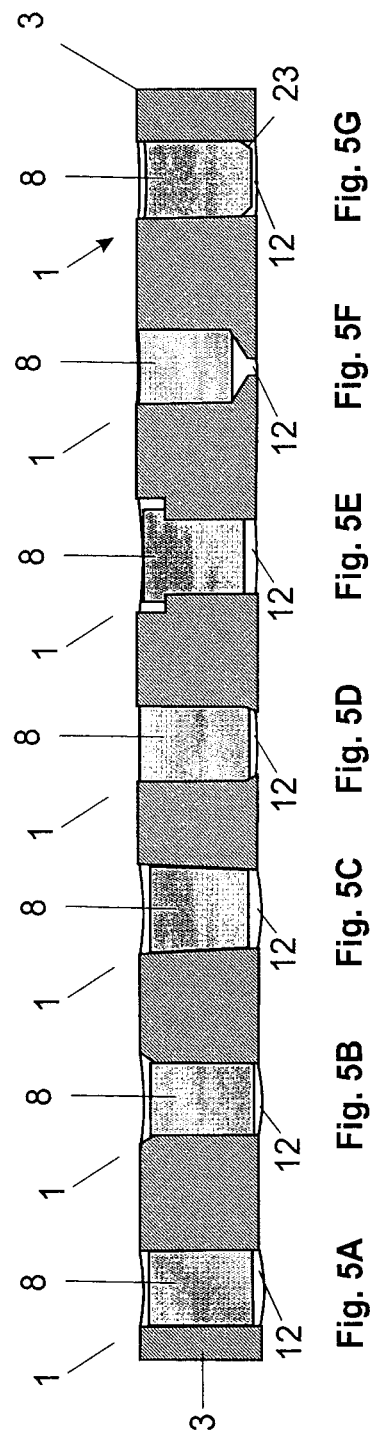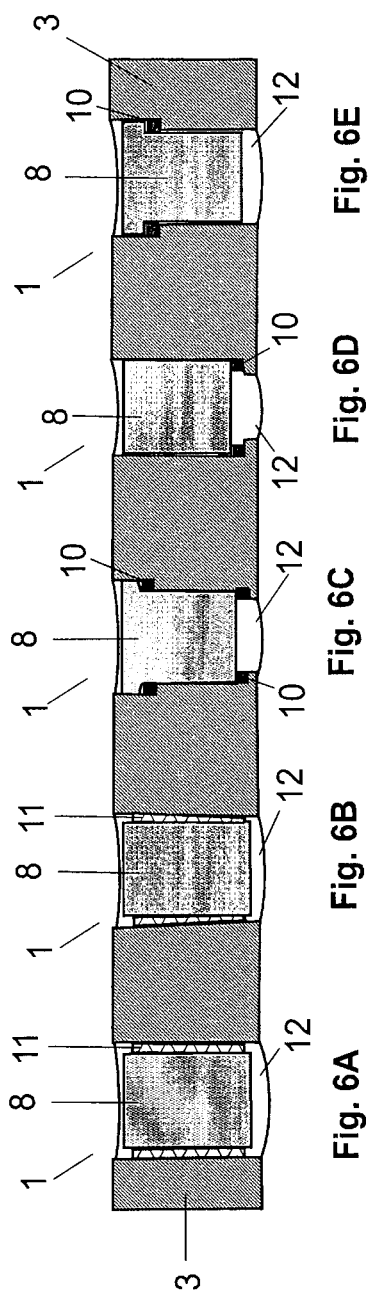

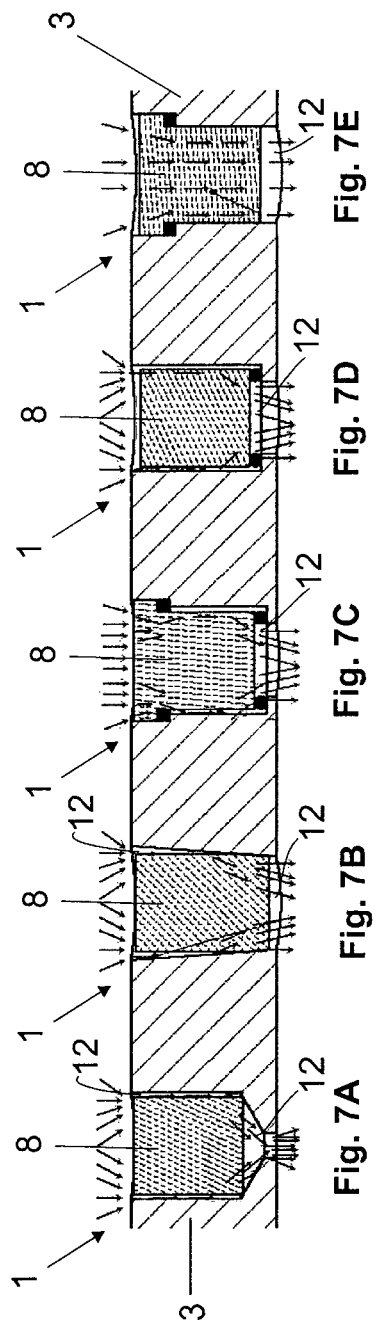
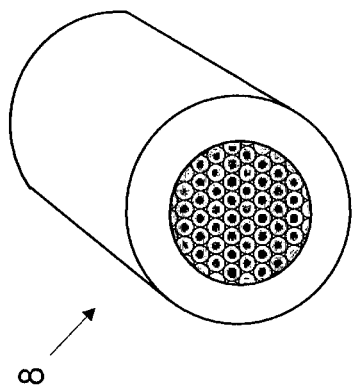
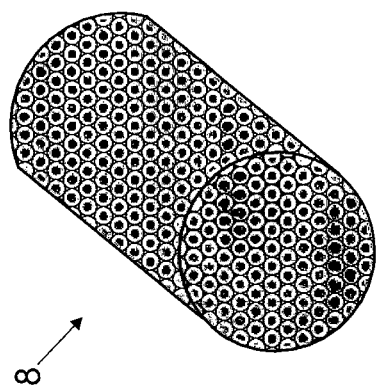

FLOW RESTRICTOR AND GAS COMPRESSOR

The present invention relates to a flow restrictor configured to provide a limitation and/or control in the gas flow used in the bearing formation between a piston and a cylinder of a gas compressor.

The present invention also relates to a gas compressor comprising at least one flow restrictor as above.

DESCRIPTION OF THE STATE OF THE ART

Currently, it is quite common using piston (plunger) and cylinder sets driven by electric motors for application in gas compressors of refrigeration equipment, such as domestic/commercial/industrial refrigerators, freezers, and air conditioners.

In these types of compressors, the electric motor drives the piston which, in turn, moves inside the cylinder in an axial back and forth movement, as to compress and decompress the gas successively. Usually, in this cylinder head gas discharge and suction valves are positioned, which regulate respectively the low pressure gas inlet, and the high pressure gas outlet within the cylinder. As such, the axial movement of the piston within the compressor cylinder performs the compression of the gas admitted by the suction valve, increasing its pressure, so to provide direction of the gas flow through the discharge valve to a high pressure region.

One of the technical challenges observed in this type of gas compressor is to avoid a direct contact between the piston and the cylinder. Thus, due to the relative motion between the piston and the cylinder, the piston bearing formation through a fluid arranged in the gap between these two parts, avoiding its premature wear, is necessary. The presence of the fluid between the piston and the cylinder also provides the reduction of friction between them, which allows a reduction in mechanical loss of the compressor.

Linear compressors often use a type of bearing formation known as aerostatic bearing formation, which consists of the implementation of a gas cushion between the piston and the cylinder, avoiding the contact between them. The use of aerostatic bearing formation is advantageous with respect to other types of bearing formation, since, considering the gas has a viscous friction coefficient lower than oil, the dissipated energy for the bearing formation is smaller, which contributes to a better compressor efficiency. Another additional advantage of using the gas itself as a lubricant fluid consists of the absence of the need to use an oil pumping system.

It should be noted that the gas used for the bearing formation can consist of a part of the very gas pumped by the compressor and used in the refrigeration system, which is diverted, after its compression, towards the existing gap between the piston and the cylinder, forming a gas cushion which avoids contact between them. In this way, it is observed that all the gas used in the bearing formation represents a loss in compressor efficiency, since the main function of the compressed gas is its direct application in the refrigeration system to generate cold. This way, the part of diverted gas volume for the bearing formation must be as small as possible as to avoid significantly affecting the compressor efficiency.

Usually, in order to obtain an efficient functioning of the aerostatic bearing, it is necessary to use a flow restrictor capable of limiting the compressed gas flow arising from a high pressure region of the compressor, so that the gas pressure present in the gap between the piston and the cylinder is smaller and suitable for the application. In other words, such restriction aims at allowing reducing or controlling pressure in the bearing formation region through the compressed gas flow restriction arising from a high pressure region of the compressor.

Several constructive configurations have already been developed as to allow the implementation of restrictors to provide the pressure reduction in the bearing formation region.

For example, U.S. Pat. No. 6,901,845 describes a restrictor comprising a porous medium, in which a porous strip is used along with compression rings. A disadvantage of this type of configuration consists of the need of precision in making the compression rings, which increases the cost of the productive process, besides the difficulty of dimensional control.

U.S. Pat. No. 6,293,184 discloses restrictors formed by microchannels arranged along the outer cylinder wall which, together with a sleeve into which said cylinder in inserted, form closed and isolated channels, yielding a plurality of restrictors. Analogous to the patent previously mentioned, a disadvantage of this type of configuration consists of the need of precision in the manufacture of the sleeves, which increases manufacturing costs. An additional disadvantage of this art results from the fact that this type of microchannels is susceptible to obstruction by particles or soil present in the compressor, flow which is necessary a filter which guarantees that the fluid reaches the restrictors with no type of soil, which, otherwise, will hinder the correct functioning of the equipment.

International Patent Application WO/2008/055809 describes restrictors consisting of micro-holes arranged in the cylinder wall, manufactured with laser application. Again, the manufacturing of micro-holes requires great precision, which might impair the compressor production at competitive market costs. Further, the obstruction of micro-holes by particles or soil present in the compressor can occur.

Thus, a satisfactory and efficient solution for providing restriction in gas flow used in bearing formation between a piston and a cylinder of a gas compressor, which presents good reliability, performance, applicability, and low cost, is not yet known.

OBJECTS OF THE INVENTION

A first object of the present invention consists of low cost providing a porous flow restrictor configured to allow a limitation and/or control of flow/gas pressure used in bearing formation between a piston e a cylinder of a gas compressor, reducing or avoiding efficiency loss of said gas compressor, as to obtain optimum performance and acting.

A second object of the present invention consists of promoting a porous flow restrictor, capable of allowing the diverting of at least part of the compressed gas flow through a gas compressor for a bearing formation region between its piston and cylinder, without compromising the efficiency of said gas compressor significantly.

A third object of the present invention consists of providing a porous flow restrictor capable of allowing a limitation of gas flow using a bearing formation between a piston and a cylinder of a gas compressor.

A fourth object of the present invention consists of promoting an efficient sealing of the restrictor.

The fifth object of the present invention consists of providing the restrictor with the ability of filtering the gas impurities.

A sixth object of the present invention consists of providing a gas compressor which comprises a porous flow restrictor according to any or a combination of the objects mentioned above.

BRIEF DESCRIPTION OF THE INVENTION

A first way of reaching the first, second and/or third object of the present invention is through the provision of a flow restrictor for applying in bearing formation between a piston and a cylinder of a gas compressor, the gas compressor comprising at least a pad externally surrounding the cylinder. Besides, the gas compressor also comprises an inner cavity arranged between the pad and the cylinder, fluidly fed through a discharge flow arising from a compression movement exerted by the piston within the cylinder. Additionally, the gas compressor further comprises a bearing formation gap which separates a piston outer wall and an inner cylinder wall. Further, the gas compressor also comprises a flow restrictor provided with a housing which fluidly associates the inner cavity to the bearing formation gap. Such flow restrictor comprises at least porous element associated to the housing and provided with at least a restrictor part provided with a porosity dimensioned to limit the gas flow flowing from the inner cavity to the bearing formation gap.

A second way of reaching the first, second and/or third object of the present invention is through the provision of a flow restrictor for applying in bearing formation between a piston and a cylinder of a gas compressor. Such gas compressor comprises at least a pad which externally surrounds the cylinder. Additionally, the gas compressor also comprises at least an inner cavity, arranged between the pad and the cylinder, fluidly fed through a discharge flow arising from a compression movement exerted by the piston within the cylinder. Additionally, the gas compressor further comprises at least a bearing formation gap which separates a piston outer wall and an inner cylinder wall. Further, the gas compressor also comprises at least a flow restrictor provided with a housing that fluidly associates an inner cavity to the bearing formation gap. Such flow restrictor comprises at least a porous element, associates to the housing, provided with at least a restrictor part provided with a pre-established porosity. Said porous element has a cross section with a pre-established area and a pre-established length, in which the relationship between the restrictor part porosity and cross section and the length of the porous element is configured to limit the gas flow which flows from the inner cavity to the bearing formation gap optimally.

The fourth object of the present invention is reached through the provision of a flow restrictor for the application in aerostatic bearing formation between the piston and a cylinder of a gas compressor in which the restrictor is comprised of a housing, a restriction element and an intermediate part which contains a sealing tab capable of radially flexing for sealing.

The fifth object of the present invention is reached through the provision of a flow restrictor for the application in aerostatic bearing formation between a piston and a cylinder of a gas compressor in which the restrictor is comprised by at least a housing and a porous element, the porous element comprising in its end turned towards the gas inlet a region with superficial area superior to the cross sectional area of the rest of the porous element body.

The sixth object of the present invention is reached through the provision of a gas compressor comprising a cylinder, a piston reciprocally movable within the cylinder and a flow restrictor according to the first or second ways described above.

BRIEF DESCRIPTION OF THE DRAWINGS

The present invention will be described below with further details, referring to the attached drawings, in which:

FIG. 5A—represents a side cut view of a first preferred embodiment of the flow restrictor of the present invention;

FIG. 5B—represents a side cut view of a second preferred embodiment of the flow restrictor of the present invention;

FIG. 5C—represents a side cut view of a third preferred embodiment of the flow restrictor of the present invention;

FIG. 5D—represents a side cut view of a fourth preferred embodiment of the flow restrictor of the present invention;

FIG. 5E—represents a side cut view of a fifth preferred embodiment of the flow restrictor of the present invention;

FIG. 5F—represents a side cut view of a sixth preferred embodiment of the flow restrictor of the present invention;

FIG. 5G—represents a side cut view of a seventh preferred embodiment of the flow restrictor of the present invention;

FIG. 6A—represents a side cut view of an eighth preferred embodiment of the flow restrictor of the present invention;

FIG. 6B—represents a side cut view of a ninth preferred embodiment of the flow restrictor of the present invention;

FIG. 6C—represents a side cut view of a tenth preferred embodiment of the flow restrictor of the present invention;

FIG. 6D—represents a side cut view of an eleventh preferred embodiment of the flow restrictor of the present invention;

FIG. 6E—represents a side cut view of a twelfth preferred embodiment of the flow restrictor of the present invention;

FIG. 7A—represents a side cut view showing a first gas flow path;

FIG. 7B—represents a side cut view showing a second gas flow path;

FIG. 7C—represents a side cut view showing a third gas flow path;

FIG. 7D—represents a side cut view showing a fourth gas flow path;

FIG. 7E—represents a side cut view showing the preferred configuration of the gas flow path of the present invention;

FIG. 8A—represents a perspective view of a first preferred embodiment of the porous element of the present invention; and FIG. 8B—represents a perspective view of a second preferred embodiment of the porous element of the present invention.

DETAILED DESCRIPTION OF THE DRAWINGS

Figure 1:
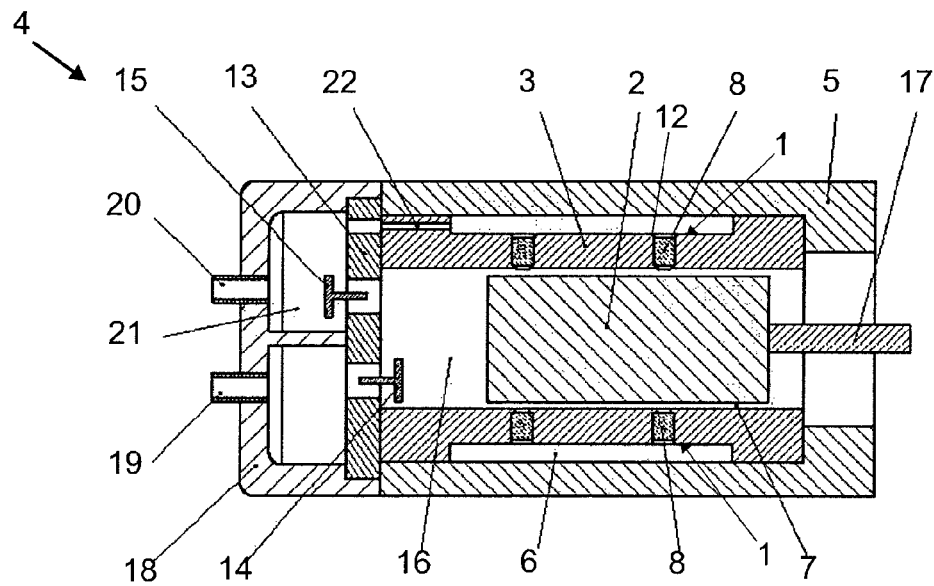
FIG. 1—represents a side cut view of a gas compressor, object of the present invention, comprising a first preferred embodiment of a flow restrictor, also object of the present invention, when its suction valve is in the open state.

FIG. 1 illustrates a gas compressor 4 of the linear type according to a preferred embodiment of the present invention.

Such gas compressor 4 comprises at least a piston 2, a cylinder 3 and a head 13 positioned in its top or top part, forming along with piston 2 and cylinder 3, a compression chamber 16, the oscillatory axial movement by the piston 2 within the cylinder 3 providing the gas compression in the compression chamber 16.

As can be seen in FIG. 1, the gas compressor 4 is also provided with at least one suction valve 14 and one discharge valve 15, positioned in the head 13, which regulate the gas inlet and outlet of the compression chamber 16. The gas compressor 4 is also provided with an actuator 17, associated to a linear motor, capable of actuating the piston 2.

In other words, piston 2, driven by said linear motor, has the function of developing an alternative linear movement, which allows the piston movement 2 within the cylinder 3, as to provide a compression action of the gas admitted through the suction valve 14, to the point in which it can be discharged to the high pressure side through the discharge valve 15.

Gas compressor 4 is also provided with a discharge passageway 20 and a suction passageway 19, positioned in a lid 18, which connect the gas compressor 4 with the other parts, portions and components of a refrigeration system.

Moreover, the gas compressor 4 also comprises at least a pad 5 which externally surrounds the cylinder 3.

Additionally, the gas compressor 4 comprises at least an inner cavity 6, arranged between the pad 5 and the cylinder 3, fluidly fed by a discharge flow arising from the compression movement exerted by the piston 2 within the cylinder 3. The inner cavity 6 is formed by the outer diameter of the cylinder 3 and the inner diameter of the pad 5.

Still, the gas compressor 4 comprises at least a bearing formation gap 7 which spaces apart a piston outer wall 2 and an inner cylinder wall 3, as can be seen in FIG. 1. The gas used for the bearing formation consists, preferably, of the gas pumped by the gas compressor 4 and used in the refrigeration system. This compressed gas is diverted from a discharge chamber 21 to an inner cavity 6 through a linking channel 22.

The gas compressor 4 comprises at least a flow restrictor 1, also an object of the present invention, provided with a housing 12 which fluidly associates the inner cavity 6 to the bearing formation gap 7. The shape of the housing 12 can be substantially cylindrical, substantially tapered or substantially "T" shaped (see FIGS. 5A, 5B, 5C, 5D, 5E, 5F, 6A, 6B, 6C, 6D, and 6E).

As mentioned above, the function of the flow restrictor 1 is to provide the bearing formation between the piston 2 and the cylinder 3 of the gas compressor 4. In other words, the flow restrictor 1, arranged between the inner cavity 6 (high pressure region) and the bearing formation gap 7, is capable of controlling pressure in the bearing formation region and restricting the gas flow.

Figure 2:
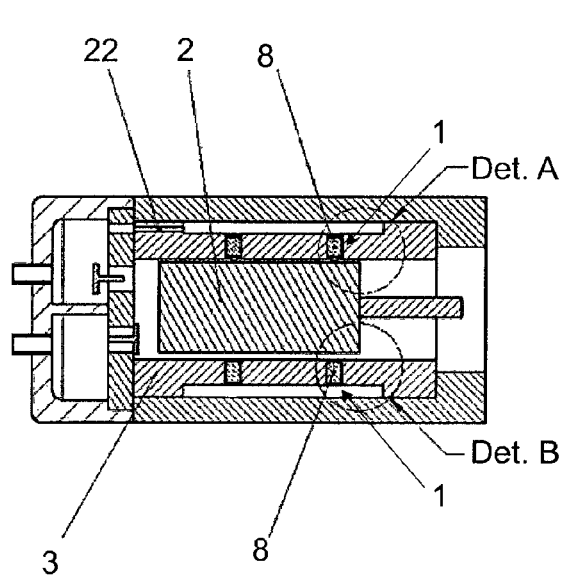
FIG. 2—represents a side cut view of the gas compressor shown in FIG. 1, when its suction valve is in the closed state.
Figure 3:
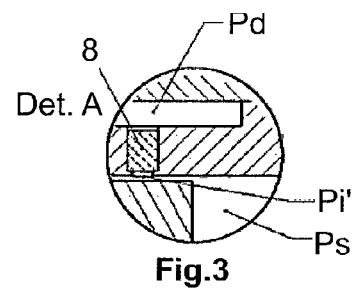
FIG. 3—represents a first detail of FIG. 2.

From FIGS. 2, 3 e 4 it is possible to understand the functioning of the aerostatic bearing of the present invention. The inner cavity 6, connected to the discharge chamber 21 through the linking channel 22, presents gas with a discharge pressure Pd, which feeds flow restrictors 1. This gas, by passing through flow restrictors 1, loses pressure, forming an intermediate pressure Pi gas cushion in the bearing formation gap 7. This is the pressure that supports the piston 2 and averts it from touching the inner cylinder wall 3. Finally, the gas runs out from the bearing formation gap 7, reaching a low pressure, corresponding to the suction pressure Ps of the gas compressor 4.

When some axial effort is applied to the piston 2 as to get closer to the cylinder wall 3 e, consequently, to the flow restrictor 1, the bearing formation gap 7 in this region is reduced (FIG. 3: detail A). The reduction of the bearing formation gap 7 leads to an increase in the load loss of the gas flow in the region in which it runs between the piston 2 and the cylinder 3. This increase of load loss leads to the reduction in the discharge of the gas flow passing through the flow restrictor 1 and through the bearing formation gap 7 in the region adjacent to the flow restrictor 1. The reduction of discharge results in a reduction of gas flow speed, which, in turn, leads to a reduction in load loss in flow restrictor 1. This reduction in load loss of the gas flow passing through the flow restrictor 1 allows the gas reaching the bearing formation gap 7 in the flow restrictor region 1 to reach a pressure Pi', higher than the intermediate pressure Pi. This increase in pressure acts as to avoid the piston 2 from getting even closer to the cylinder wall 3 in the flow restrictor region 1, avoiding contact between the piston 2 and the cylinder 3.

Figure 4:
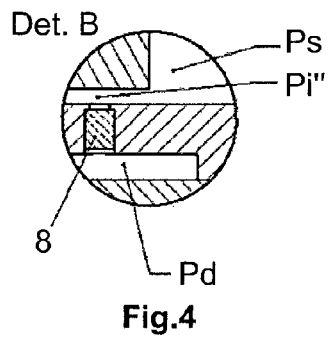
FIG. 4—represents a second detail of FIG. 2.

On the other hand, in the opposite bearing formation gap region 7 (FIG. 4: detail B), the piston 2 withdraws from the cylinder wall 3 and from the flow restrictor 1. The increase of the bearing formation gap 7 leads to the reduction in load loss of the gas flow in the gap region, increasing gas discharge passing through gap and flow restrictor 1. The gas flow speed increase increases the flow load loss in the flow restrictor 1, which causes the gas to reach the bearing formation gap 7 in the flow restrictor region 1 with a lower pressure Pi" than the intermediate pressure Pi. This intermediate pressure reduction in the flow restrictor region 1 acts as to reestablish the force balance of the bearing, avoiding contact of the piston 2 against the wall in the opposite region of the cylinder 3.

The flow restrictor 1 comprises at least one porous element 8, associated to housing 12, provided with at least a restrictor part provided with a porosity sized to limit the gas flow flowing from the inner cavity 6 to the bearing formation gap 7. Preferably, the restrictor part is positioned within the housing 12. This way, the gas passes through the porous element 8 towards the bearing formation gap 7, forming a gas cushion avoiding contact between the piston 2 and the cylinder 3.

Note that, by passing through the porous element 8, the gas can have dust particles or soils which tend to accumulate in the top side of the porous element 8, for it is the first region to come into contact with such residue. As a result, this first part to contact the gas ends up accumulating such residue, locking the gas passage through this structure, interfering in the gas restriction and, consequently, in its life cycle.

However, such problem can be solved through a configuration in which the porous element 8 is provided with, in the upper part, a larger area to contact the gas, distributing, thus, the residue through this region, as to lengthen the life cycle. A preferred configuration of such solution can be found in FIG. 12, disclosing a restrictor 1 provided with a porous element 8 provided with a head 26 with a greater cross section than the rest of the porous element body 8. This head 26 will act, therefore, as a filter for impurities present in the gas as to lengthen the life cycle of the flow restrictor 1, that is, the restrictor 1 will operate for longer before it is obstructed by impurities.

Figure 12:
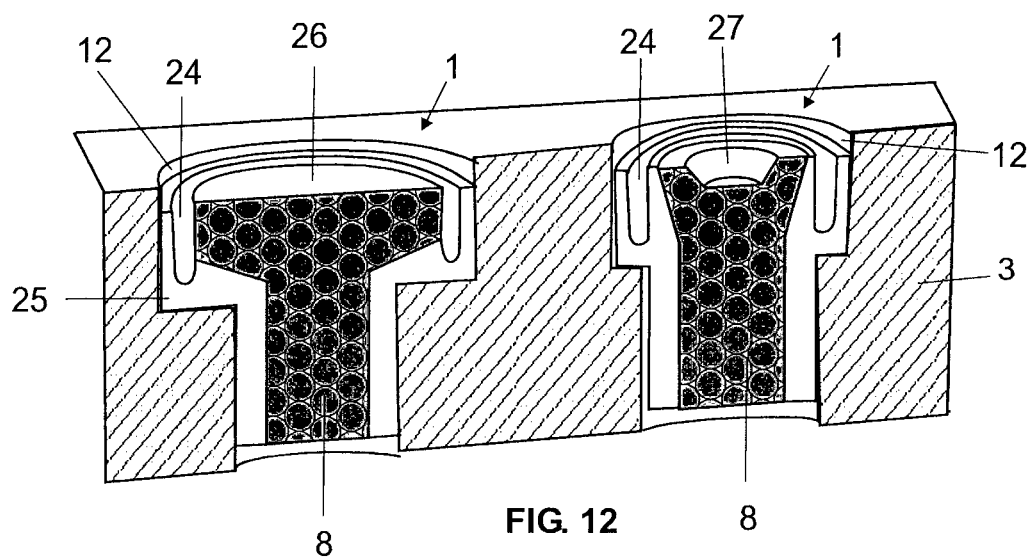
FIG. 12—represents two constructive modifications defining a head and a concavity in the porous element end.

In a second preferential configuration, FIG. 12 shows a porous element 8 provided with a concavity 27 ("funnel" shaped) as to increase the superficial area of the top end of the porous element 8 which will maintain the first contact with the gas flow and, this way, it will be the first region to act as a filtering element to gas impurities. Naturally, other solutions can be used to increase the top contact area in the gas inlet region in the porous element 8.

It should be noted that all the gas used in bearing formation represents an efficiency loss of the compressor, for the first and foremost function of the gas is to be sent to the refrigeration system and provide temperature reduction. This way, the diverted gas for a bearing formation must be the least possible as to not compromise compressor efficiency. In face of this, the porosity of the porous element restrictor part 8 was projected as to have a pre-established porosity, and, additionally, the porous element 8 was projected to possess a cross section and an also pre-established length, where the relationship between porosity, the cross sectional area of the restrictor part and the length of the porous element 8 is configured to limit the gas flow flowing from the inner cavity 6 to the bearing formation gap 7 optimally. Preferably, the porosity of the porous element 8 varies between 10% and 30%. The cross section and the length of the porous element 8 can vary according to a preferred embodiment to be implemented, as can be seen in FIGS. 5A, 5B, 5C, 5D, 5E, 5F, 5G, 6A, 6B, 6C, 6D, and 6E.

In other words, considering that the load loss imposed on the gas flow passing through the porous element 8 is proportional to the relationship of the porosity with its length and diameter, said porous element 8 can be sized, varying this magnitude relationship. For a determined length, the highest the porosity the lowest the restriction imposed upon the flow. Considering a same porosity, for a determined inner diameter, the greater the length, the greater the restriction to gas flow and vice-versa. This relationship can also be verified referring to the increase of the cross section. From this relationship of variables—porosity, an area transversal to flow and length—one can reach the necessary load loss for any bearing of the gas compressor 4.

For example, taking into account that the piston 2 suffers with the loss of sustentation when in its superior dead center due to the high pressure existing in the compression chamber 16, it is desirable that the bearings of this region of the cylinder 3 provide a greater gas discharge than the bearings present in the lower part of the cylinder 3. In this case, it possible to act in one of the variables mentioned above as to reach a greater discharge in the flow restrictors 1 mounted in the region nearest to the suction 14 and discharge 15 valves.

The porous elements 8 can consist, for example, of ceramic, metallic, or other porous material, which can be obtained through any process capable of assuring the necessary porosity features. One of the many materials that can be used is stainless steel.

Porous element 8 can present any shape, wherein in a preferred configuration it can have a substantially cylindrical shape, which would suit well a housing 12 obtained through a simple process of hole boring the cylinder wall 3.

Thus, several housing 12 and porous element 8 geometries can be used as to make possible and facilitate mounting, assuring the correct positioning of the porous element 8 relative to the cylinder 2. FIGS. 5A, 5B, 5C, 5D, 5E, 5F, and 5G show a first, second, third, fourth, fifth, sixth, and seventh preferable configurations in which occurs an attachment of the porous element 8 by way of interference in the housing 12 and the cylinder 3. Alternatively, the porous element 8 can be threaded in the housing 12 (not shown).

As can be seen in the preferred embodiments illustrated in FIG. 5B (second preferred embodiment), the housing 12 can have a jagged end turned towards the inner cavity 6, which makes it easier to insert the porous element 8.

The housing 12 and the porous element 8 (FIG. 5C) can be parallel or tapered (FIGS. 5A e 5C), the housing 12 can present a staggered bore (FIG. 5D), serving the smaller diameter to limit and axially position the porous element 8 relative to the cylinder 3. In another preferred configuration, the housing 8 can have a cam (FIG. 5E) for the same positioning function. Note, also, that the shape of the housing 12 resulting from the hole boring with commercial drill bits can serve to position the porous element 8 (FIG. 5F).

In turn, the attachment of the porous elements 8 in the cylinder 3 must assure the sealing between the porous element and the walls of the housing 12, making, this way, the gas pass through the porous medium and, thus, suffer a pressure drop necessary to the functioning of the aerostatic bearing. The gas passage, at least in great amounts, through an eventual gap between the porous element 8 and the cylinder wall 3 must be avoided. Note that the flow restriction offered by the porous element 8 is too high and, because of that, any gap or imperfection in the surface of the porous element 8 or of the housing 12 can cause a flow divert and a load loss drop.

FIGS. 7A, 7B, 7C and 7D show the preferred path of gas when there is a gap between the porous element 8 and the housing 12. In these cases, due to the drop in load loss caused by the flow divert, an increase in gas discharge occurs, which, besides reducing the compressor 4 efficiency, puts the functioning of the aerostatic bearing in risk. FIG. 7E shows an example of how the gas flow of the present invention should occur, that is, that the gas should pass through the whole cross section of the porous element 8, because only this way the required discharge in the bearing is reached.

The porous element 8 must be associated to the housing 12 through any solution that assures sealing between the porous element 8 and the housing wall 12 in the cylinder 3. Some examples of such constructive configurations are presented in FIGS. 6A, 6B, 6C, 6D, and 6E. In addition to the already referred possibilities, interference or threading, the attachment of the porous element 8 to the housing 12 can be reached through gluing, wherein the use of a glue with such a viscosity that it does not penetrate the porous element 8 by capillarity, a situation which could shorten the life cycle of the porous element or even compromise its functioning, is recommendable.

This way, the porous element 8 can be provided with substantially the same porosity in all its volume (see FIG. 8A), or, as to facilitate the possibility of attachment through gluing, the porous element 8 can be provided with two different porosities, that is, a smaller porosity in its outer region and a greater porosity in its inner region (see FIG. 8B).

In a double porosity situation, it is possible to have an inner porosity which varies, for example, between 10% and 30%, and an outer porosity which is less than 6%. Note that the goal of having a porous element 8 provided with double porosity is to impede the glue or adhesive used in the sealing from penetrating the inside of the porous element 8, that is, its functional part.

In an eight preferred configuration, FIG. 6A shows the insertion of the porous element 8 in a sealing bushing 11 (which can be made of plastic, heatshrink plastic, for example) with later gluing or insertion by interference of the set into the cylinder 3 housing 12.

FIG. 6B shows a ninth preferred configuration with a similar solution, wherein, in this case, the porous element 8 is inserted in a sealing bushing 11, the set being later inserted in a tapered hole so that the sealing bushing 11 is deformed according to the housing 12, staying, thus, attached in it.

Figure 9:
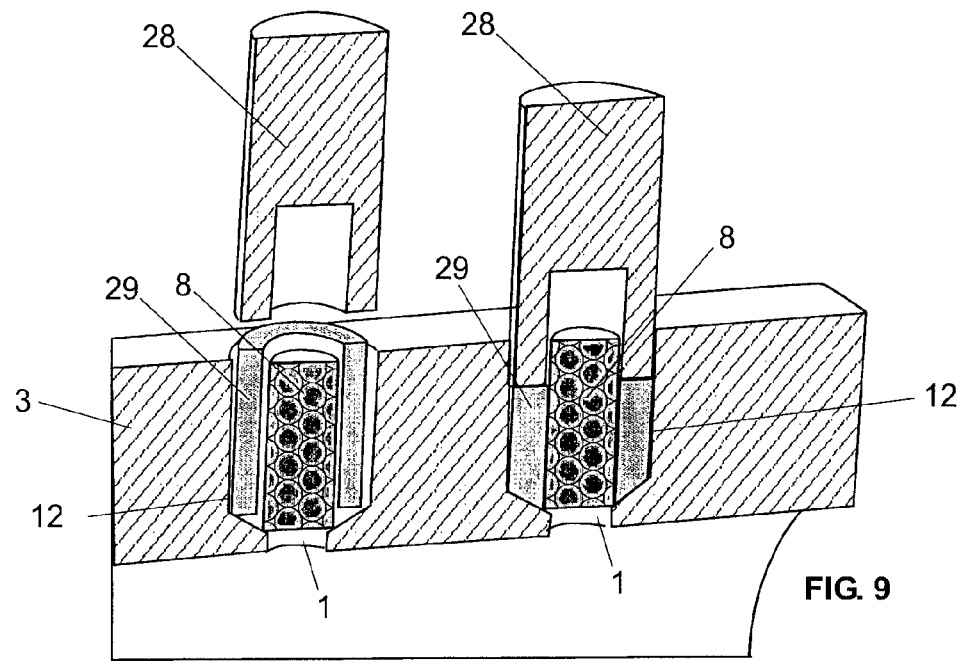
FIG. 9—represents a side cut view highlighting the application of a deformable jacket in the flow restrictor.

Additionally, FIG. 9 discloses another way of sealing the restrictor 1, which can comprise a deformable jacket 29 inserted in the housing 12 with the flow restrictor 1. After insertion, a plastic deformation of the deformable jacket 29 is performed. This deformation is capable of filling any microspaces existent between the interfaces formed by the set of deformable jacket 29 and the housing 12 and between the deformable jacket 29 and the porous element 8. Such deformation can be provoked by a tool 28 which, in one of its ends, comprises a section analog to the spacing occupied by the jacket 29, for example, tubular, as to pressure it, deforming it. As an additional consequence, it is noted that the compression of the deformable jacket 29 will make it be arranged under the top side of the porous element 8. This way, the top part of the porous element 8 that does not find itself surrounded by the deformable jacket 29, will enlarge the area that will act as filtering element of the existing residue in the gas.

Note that this deformable jacket 29 can be made of any type of material that is plastically deformed from a maximum pressure limit, such as metallic, composite or polymeric materials. One of the materials applied can be a deformable mass of the Durepoxi® type, which, after the application process, can be submitted to a step of curing configured to give hardness to the compacted form of the deformable jacket.

Figure 10:
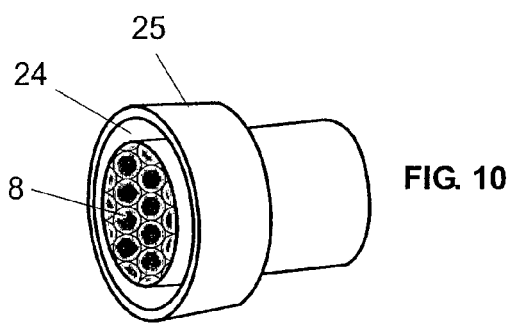
FIG. 10—represents a perspective view of a preferential configuration of the porous element comprising a deformable part.
Figure 11:
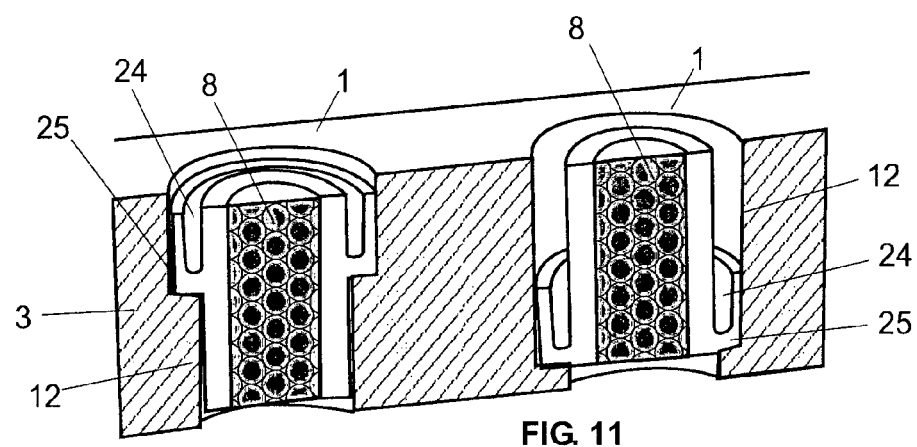
FIG. 11—represents a side cut view of the porous element, comprising a deformable part in application in a cylinder.

An additional form of sealing can comprise a sealing tab 25 (see FIG. 10) arranged in one of the ends of the porous element 8. This additional form of sealing, preferably but not compulsory, requires the porous element 8 to be of double porosity (such as previously described, and disclosed in FIG. 8B). Additionally, it is necessary that the sealing tab 25 has a greater cross section than the cross section of the rest of the porous element body 8 and, simultaneously, it must comprise a radial groove 24 arranged in its interior. Note that the radial groove 24 must be turned towards the gas flow inlet, so that this sealing tab 25 is internally bent when the porous element 8 is pressured against a housing 12, leading to sealing.

Alternatively, instead of the porous element 8 of the previous example being provided with double porosity, it can be a porous element 8 provided with an outer layer of a material with elastic features, the polymeric/elastomer type. Thus, instead of the sealing tab 25 deform radially towards the center of the porous element 8, as in the previous example, the pressure of the gas flow will promote the elastic and radial bending of the sealing tab 25 towards the housing 12, leading to sealing.

Note that this flow restrictor 1 which comprises the sealing tab 25 can be inserted in the housing 12 with the side corresponding to the deformable part 25 turned to the inner cavity 6 or to the bearing formation gap 7 (see FIG. 3), wherein the housing 12 can be configured for either of the arrangements.

The attachment of the porous element 8 in the housing 12 of the cylinder 3 can also be reached by the simple interaction between the porous element 8 and the housing 12. For such, the porous element 8 must have such a plasticity that will allow it to suffer a substantially outer and partial deformation as to accommodate itself within the housing 12. Note that the possibility of fracture is one of the great difficulties present in these technologies, since the possibility of a fragile fracture of the restrictor could take place during attachment, due to the low elastic limit of such elements. For such, a metallic porous element 8 can be used, for, as it is known, metal has a plastic deformation capacity greatly superior to that of ceramic materials.

Preferably, at least three flow restrictors 1 in a given dada section of the cylinder 3, and at least two sections of flow restrictors 1 in the cylinder 3 are implemented in the gas compressor 4, as to maintain the balance of the piston 2 inside the cylinder 3. Further, the flow restrictors 1 are positioned so that, even with the piston 2 oscillation movement, they are never uncovered, that is, the piston 2 does not leave the actuation area of the flow restrictors 1.

Preferably, the porous element 8 is substantially cylindrical and has a cross section with a substantially circular shape, since the housing 12 confection can be done through a simple and inexpensive process, such as hole boring. Naturally, the porous elements 8 can present other forms of cross section.

Still preferably (first, second, fourth, sixth, eight, ninth, and eleventh preferred embodiments, illustrated in FIGS. 5A, 5B, 5D, 5E, 6A, 6B, and 6D, respectively), the porous element 8 has a substantially "I" shaped profile (in other words, cylindrical).

Alternatively, according to the third preferred embodiment of the present invention, the porous element 8 has a substantially tapered profile, as shown in FIG. 5C.

In the fourth, tenth, and twelfth preferred embodiments of the present invention, shown in FIGS. 5E, 6C e 6E, respectively, the porous element 8 has a substantially "T" shape.

According to the seventh preferred embodiment of the present invention, the porous element 8 comprises an extreme part 23 configured in a substantially tapered shape, the extreme part 23 being invertible in the housing 12, as can be seen in FIG. 5F. Such tapered shape makes the insertion of the flow restrictor 1 easier, so that sealing is easier.

According to the tenth, eleventh, and twelfth preferred embodiments of the present invention, shown in FIGS. 6C, 6D, and 6E, the flow restrictor 1 comprises a sealing ring 10 arranged inside the housing 12, the sealing ring 10 radially surrounding at least a portion of the porous element 8. Preferably, the sealing ring 10 consists of an O-ring type ring. The porous element 8 must maintain a contact that assures the sealing of its sides, wherein, in this case, glue or mounting through interference can be used.

This way, the porous element 8 can have a length of the same size as the thickness of the cylinder wall 3, as it can be shorter or longer, or even have a smaller length than its outer diameter, assuming a disc shape, according to the first embodiment of the flow restrictor 1 of the present invention, shown in FIG. 5A.

Thus, the present invention provides several ways of attaching the porous element 8, as to assure the sealing between the outer wall of said porous element 8 and the inner wall of the housing 12, making the gas go through the porous part of the porous element 8 to suffer a pressure drop necessary for the functioning of the aerostatic bearing. In other words, the present invention allows the gas not to pass for an eventual gap between the porous element 8 and the cylinder wall 3. In short, the preferred embodiments illustrated in FIGS. 5A to 6E, described above, show different ways of assuring the attachment and sealing of the porous elements 8 in the housing 12, wherein they can be performed according to any or any combination of the preferred embodiments stated above.

Whereas examples of preferred embodiments have been described, it must be understood that the scope of the present invention includes other possible variations, being limited only by the essence of the claims, where the possible equivalents are included.

The invention claimed is:

1. A gas compressor comprising aerostatic bearing formation between a piston (2) and a cylinder (3), the gas compressor (4) comprising:
   a pad (5) externally surrounding the cylinder (3);
   an inner cavity (6) arranged between the pad (5) and the cylinder (3), the inner cavity (6) being fluidly fed by a discharge flow arising from a compression movement exerted by the piston (2) within the cylinder (3);
   a bearing formation gap (7) separating a piston outer wall (2) and an inner cylinder (3) wall; and
   a housing (12) which fluidly associates the inner cavity (6) to the bearing formation gap (7),
   a flow restrictor (1) placed inside the housing (12),
   wherein the flow restrictor (1) comprises a porous element (8) and a deformable jacket (29) radially and longitudinally surrounding at least part of the porous element (8), the deformable jacket (29) promoting sealing through plastic deformation, wherein the deformable jacket (29) deformation seals the interfaces between the deformable jacket (29) and the housing (12) and between the deformable jacket (29) and the porous element (8), the porous element (8) being provided with a porosity limiting the gas flow flowing from the inner cavity (6) to the bearing formation gap (7).

2. The gas compressor of claim 1, wherein the porous element (8) has a length of the same size or less than the thickness a thickness of the cylinder wall (3).

3. The gas compressor of claim 1, wherein the porous element (8) is provided with at least one circular cross section.

4. The gas compressor of claim 1, wherein the porous element (8) has an "I" shaped profile.

5. The gas compressor of claim 1, wherein the housing (12) is cylindrical.

6. The gas compressor of claim 1, wherein the housing (12) is tapered.

7. The gas compressor of claim 1, wherein the flow restrictors (1) are positioned so that the piston (2) constantly maintains contact with the with an actuation area of the flow restrictors (1).

* * * * *